United States Patent [19]
Brandstrom

[11] 3,747,819
[45] July 24, 1973

[54] CONTROL DEVICE FOR FEEDING APPARATUS FOR PUNCH PRESSES AND THE LIKE

[76] Inventor: Seth D. Brandstrom, Nya Vagen 45, 86200 Kvissleby, Sweden

[22] Filed: Oct. 7, 1971

[21] Appl. No.: 187,382

[30] Foreign Application Priority Data
Nov. 3, 1970 Sweden ..................... 14799/70

[52] U.S. Cl. .................... 226/25, 226/45, 226/162
[51] Int. Cl. ......................................... B65h 25/00
[58] Field of Search .................. 226/24, 25, 45, 162

[56] References Cited
UNITED STATES PATENTS
3,410,161 11/1968 Roch .............................. 226/45 X Primary Examiner—Richard A. Schacher
Attorney—Eric Y. Munson et al.

[57] ABSTRACT

An apparatus for punching and otherwise working metal plates, strips, wire or the like, in which the work piece is advanced by a reciprocating gripping member to a working station in the machine at which position the work piece is gripped and retained by a stationary gripping member, during the return movement of the reciprocating gripping member; the stationary gripping member in turn releasing the work piece upon further advancement of the work piece by the reciprocating gripping member, a control device carried by the reciprocating member and having friction means so adjusted as to slide over the work piece during the return movement of the receiprocating member but effective to stop the machine upon a predetermined relative movement or slippage between the work piece and the reciprocating member during the advancing movement.

5 Claims, 1 Drawing Figure

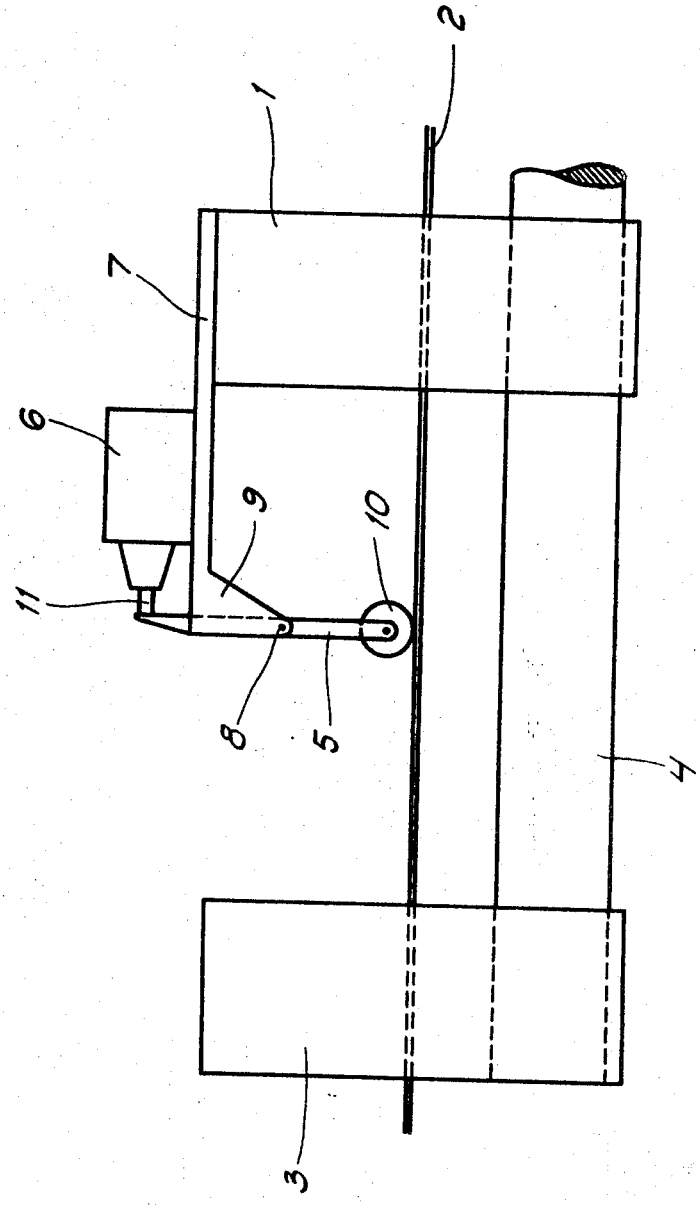

3,747,819

CONTROL DEVICE FOR FEEDING APPARATUS FOR PUNCH PRESSES AND THE LIKE

BACKGROUND OF THE INVENTION

1. Field of the Invention

The present invention refers to a control device for controlling the movement of two relatively movable objects, which in an advancing direction move syncronously but in the return movement the first object moves relatively the second object.

The present invention is especially useful in feeding apparatus for machining objects in the form of plate strip, wire or the like. In such an apparatus a movable gripping member, which can be reciprocated between an advance movement and a return movement and a stationary gripping member are used, whereby the movable member during its front movement grips the object for feeding it. During its return movement the movable member releases the object, while the object or work piece is gripped by the stationary gripping member. This stationary member releases the object when the movable member makes a further advancing member.

The feeding apparatus may further be used in machining equipment such as punching machines, and the machining object to be machined is as usual a plate strip, which is machined in one or more machines in one or more treatment stations. At such a station the fine adjustment of the feeding of the strip is made by means of guide pins, which engage holes in the plate strip punched out at a preceding station and which may be placed parallel with a stencil, but longer than the stencil and cone shaped in its free end. This fine adjustment is operative as long as the equipment is feeding the strip so the guide pins may engage said holes and penetrate into them, but in case of such a malfunction in the feeding that said guide pins cannot cooperate with the holes the pins will be pressed against solid plate and break.

2. Description of the Prior Art

In order to prevent such desctruction by stopping the punch before the guide pins reach the solid plate, it has been suggested to provide a plurality of automatic and manual means, which have the common effect of unsatisfactory operating efficiency.

The present invention solves this problem by providing a control device which sense malfunction in the feeding of the work piece and immediately stops the machine.

BRIEF DESCRIPTION OF THE DRAWING

A preferred embodiment having the novel features of the present inventions is described with reference to the attached drawing which shows a side view of a control device connected to a feeding apparatus, which is only shown in part.

DESCRIPTION OF THE PREFERRED EMBODIMENT

The figure shows two relatively movable objects. The first object is a movable gripping member mounted in the feeding apparatus 1 and the second object is a plate strip, wire or the like 2 to be punched or otherwise worked. A recirpocating movement maybe imparted to the movable gripping member 1 by the feeding apparatus. During the advancing movement the movable member grips the object, which is advanced (to the left in the figure), and during the return movement the movable member releases its grip on the work piece which is then gripped by the stationary gripping member 3 in the apparatus. This gripper member 3 releases its grip on the object when the object is being advanced by the movable gripping member. The reciprocating motion of the movable gripping member in the apparatus is produced by means of two shafts 4 (only shaft is shown), onto which is journalled the movable member 1 as well as the stationary member 3.

The movable member and the work piece during the advancing movement are designed to be moved syncronously or substantially syncronously, while during its return movement the movable member is moved relatively to the object.

The movable member 1 carries a feeler element 5 cooperating with a contact device 6 following the movement of the member 1. The contact device is supported by a plate 7. The feeler element 5 has the form of a lever arm, which at a point 8 is pivoted to a braket 9 provided at the free end of the plate 7. The feeler element is in contact with the work piece 2 via a sliding member acting under friction and the sliding member in the figure is shown as a wheel 10 which is pivoted to the free end of the lever arm 5. The other free end of the lever cooperates with a contact member 11 carried by the contact device 6. The wheel 10, which thus rolls over the work piece 2 is braked to a predetermined degree. This braking effect can be produced by known conventional devices, which may be adjustable for different braking degrees. The wheel may be covered by a friction producing material, such as rubber, over its periphery. The contact member 11 may cooperate with a spring (not shown), the force of which the lever must overcome before actuating the contact member 11. This spring may be adjustable to a variable force.

The operation of the described control device is as follows. Due to the friction between the wheel and the work piece 2, the lever 5 will keep the contact device 6 in actuated position during the return movement of the member 1, during which movement the object is gripped by the stationary member 3. The degree of friction is so adjusted that when the member 1 and the work piece are advanced the friction is so adjusted that the lever will still engage the contact device 6, as long as some feeding occurs. If a misfeed or malfunction should occur in the feeding operation so that the movable member cannot feed the object 2, but slips, the friction will cause the contact member 11 to become disengaged from the lever, and the resultant deactivation of the contact device 6 may be used to stop the machine and/or actuate a stop signal device.

By the shown embodiment an indication may occur even if the relative movement in the advancing direction between the movable member 1 and the work piece is small. The relative movement for causing the control device to become effective is determined by the aforementioned means adjustment which thus provides that one and the same control means be used in the feeding apparatus independently of the object to be treated. The adjustment means may be developed further as for example by making the wheel adjustable in its mounting in order to adjust its pressure against the object.

The invention is not restricted to the shown embodiment but may be modified within the scope of the succeeding claims. As an example the frictionally engaging means may not consist of a wheel but may consist of a suitable block, pin or the like. The position of the contact device is not restricted to the shown place but the device may be so location that the contact shaft is actuated after the relative movement occurs.

What I claim is:

1. An apparatus for punching or otherwise treating a work piece which is moved step wise to a working station in the machine, comprising:
   a. a movable member reciprocably mounted in said machine effective to grip and feed the work piece to the working station;
   b. means for reciprocating said movable member;
   c. a stationary member effective to grip and retain the work piece in the working station, upon the return movement of said movable member while the work piece is being worked;
   d. said stationary member being operative to release the workpiece upon commencement of succeeding feeding movements;
   e. a control device for stopping the operation of said apparatus upon malfunction in the feeding operation carried by said movable member and having friction means engaging the work piece;
   f. said friction means being adjusted so as to slide over the work piece during the return movement of said movable member but effective to actuate said control device upon a predetermined relative movement between the work piece and said movable member.

2. Apparatus according to claim 1, in which said friction means comprise a lever having one arm provided with means adapted to slide over the work piece, the other arm engaging a contact device for stopping the operation of the apparatus.

3. Apparatus according to claim 2 in which the sliding means comprises a roller.

4. Apparatus according to claim 2 in which said lever is adjustable relative to the work piece so as to regulate the pressure thereon.

5. Apparatus according to claim 2 having further means for said other arm to resliently engage said contact device at a predetermined force.

* * * * *